Dec. 10, 1940.                H. H. HOLLY                2,224,390
                          PATTY MOLDING MACHINE
                    Filed Feb. 20, 1939            2 Sheets-Sheet 1
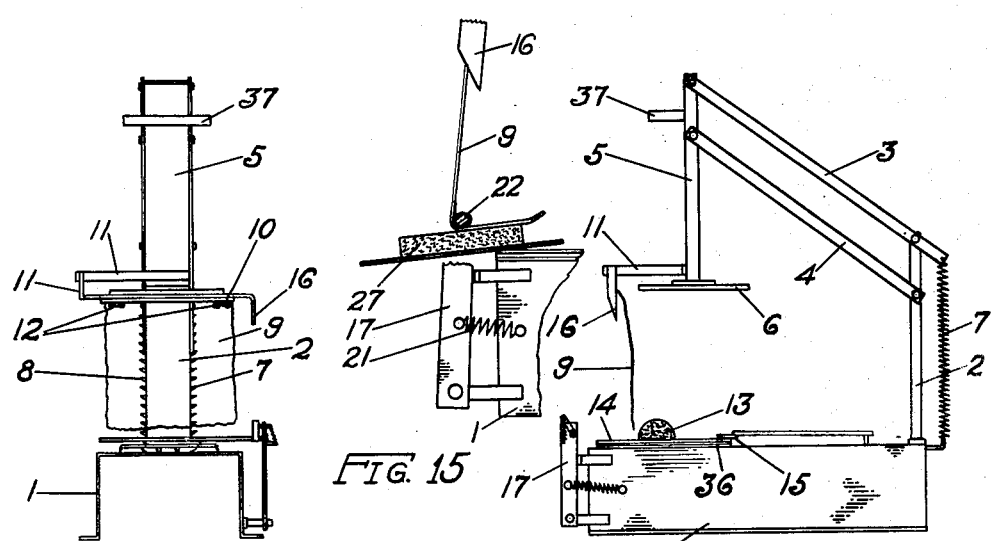
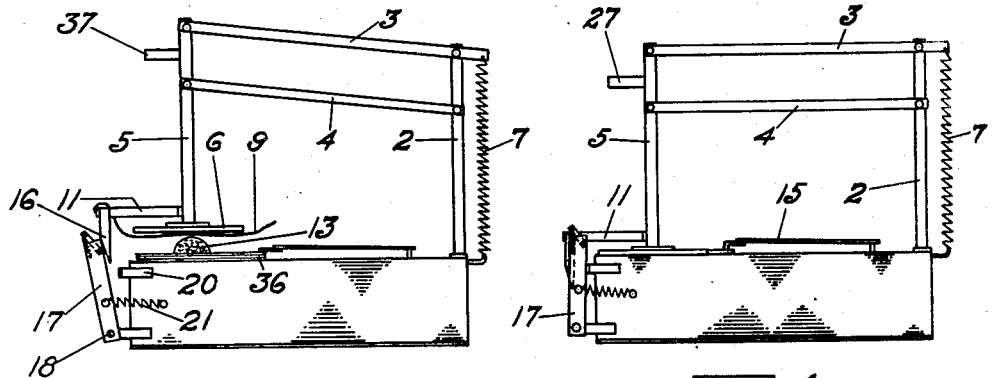
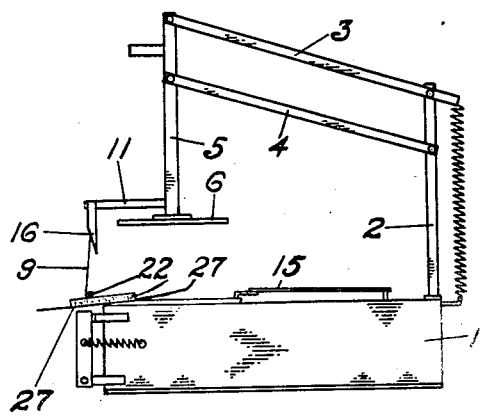
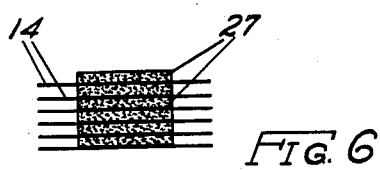
HARRY H. HOLLY
  INVENTOR
PER
ATTORNEY Dec. 10, 1940.  H. H. HOLLY  2,224,390

PATTY MOLDING MACHINE

Filed Feb. 20, 1939  2 Sheets-Sheet 2

HARRY H. HOLLY
INVENTOR
PER

*Albert J. Fihe*

ATTORNEY

Patented Dec. 10, 1940

2,224,390

UNITED STATES PATENT OFFICE 2,224,390

PATTY MOLDING MACHINE

Harry H. Holly, Chicago, Ill., assignor of one-half to Albert J. Fihe, Chicago, Ill.

Application February 20, 1939, Serial No. 257,272

18 Claims. (Cl. 107—15)

This invention relates to an improved patty molding machine, and the disclosure is directed generally to an improvement upon the invention disclosed in my prior patent on "Molding devices," No. 2,081,455, issued May 25, 1937.

One of the important objects of this invention is to provide an automatic molding device which can be used for meats or the like and which will, by a series of simple operations and a relatively simple apparatus, produce practically automatically any desired number of molded patties or similar objects.

A feature of this invention which distinguishes from my prior invention is embodied in means which accomplish the automatic removal from the molding table and subsequent stacking of completed molded objects such as meat patties or the like.

Another and further important object of the invention is to provide a compact meat patty molding machine which, on account of its relatively small size, can be readily operated on tables, counters or the like, thereby eliminating the necessity of using valuable space for operating a machine of this type.

Other and further important objects of the invention will be apparent from the disclosures in the accompanying drawings and following specification.

The invention, in a preferred form, is shown in the drawings and hereinafter more fully described.

In the drawings:

Figure 1 is a front elevation of the molding device in normal position.

Figure 2 is a side elevation showing the machine with the head up in starting position, and with a portion of meat or the like thereon in position for the molding operation.

Figure 3 shows the machine with the head moved downward into practically meat contacting position.

Figure 4 shows the machine with the head completely down and with associated operative parts in corresponding position.

Figure 5 shows the return action of the device and shows the completed patty being automatically ejected.

Figure 6 shows a stack of the resultant patties as they are produced by the machine.

Figure 15 is a partial detail view showing the ejection of the completed patty.

As shown in the drawings:

Figure 7:
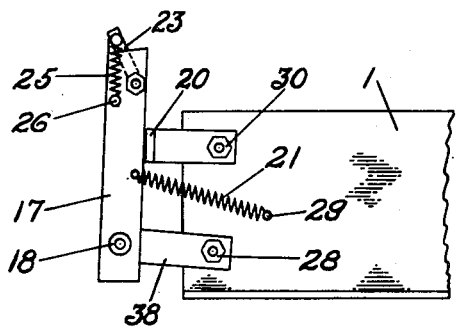
Figure 7 is an enlarged detail view of the cam portion of the automatic ejecting mechanism.
Figure 8:
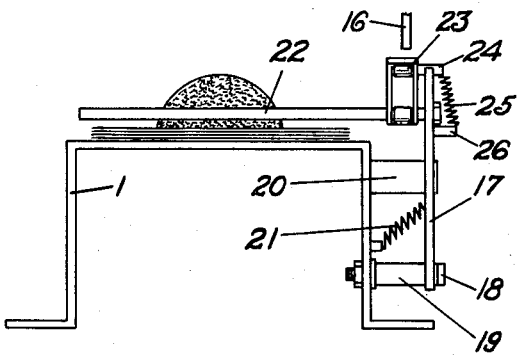
Figure 8 is a front detail of the patty ejecting mechanism.
Figure 9:
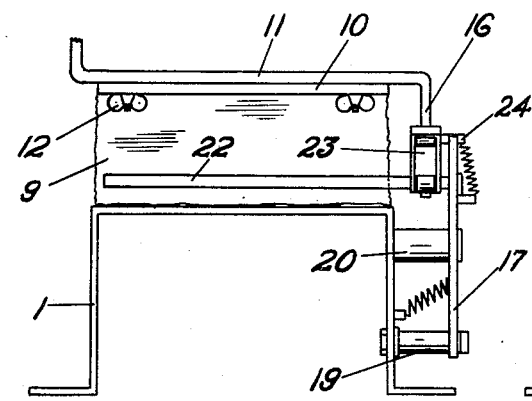
Figure 9 is a view similar to Figure 8 but showing the mold liner supporting arm and its cam coming in contact with the trigger of the automatic ejector.

The reference numeral 1 indicates generally the support or base framework of the automatic molding device of this invention, the particular type shown being one which is portable and readily positioned on tables or counters of stores or the like.

Mounted on the base 1 is a fixed upright 2, and on this upright 2, the bars 3 and 4 are pivoted as best shown in Figures 2, 3, 4 and 5.

Pivotally attached to the forward ends of the bars or links 3 and 4 is a mold supporting element 5 which has a mold or matrix 6 removably mounted on its lower end as illustrated. It will be obvious from the sequence of operation shown in Figures 2, 3, 4 and 5 that the element 5 will always move in lines parallel to the element 2. A pair of springs 7 and 8 are provided for normally constraining the parts into the uppermost position as shown in Figures 1 and 2.

So far, the mechanism described corresponds rather closely to the corresponding parts shown in my original patent, and the mechanism also includes the means for automatically inserting a mold liner 9 into the mold or matrix 6 upon every downward movement of the said matrix or molding head. This action is best illustrated by the operation as shown in Figures 2, 3, 4 and 5. The mold liner preferably consists of a sheet of Cellophane or the like, which is removably and replaceably positioned in a clamp, composed of a bar 10 mounted on an extension arm 11 bolted to the element 5. The clamping element 10 holds the Cellophane tightly against the arm 11 by winged nuts 12.

When the arms 3 and 4 with the support 5 and the mold head 6 are moved downwardly, the air resistance throws the liner 9 back into position underneath the mold 6 and directly above the portion of ground meat or other material 13 which is to be shaped or molded. The meat is deposited on one of a number of sheets of waxed paper or the like 14 which are preliminarily positioned on the base 1 and held therein by means of a spring clamp 15 having paper penetrating points 36.

Attached to or integral with the arm 11 is a pointed cam 16 which operates the ejector mechanism as best shown in Figures 7 to 11 inclusive.

The ejector mechanism includes a supporting element 17 which is fixedly mounted on a sleeve 19, the sleeve itself being rotatably positioned on a bearing pin 18, which bearing pin is fastened in the end of an extension 38 adjustably mounted on the base 1 by means of a nut 28.

A helical spring 21 has one end fastened to a pin 29 mounted on the base 1 and the other end to the supporting element 17, the spring being normally under tension, thereby constraining the support 17 to ordinarily rest against a bumper or stop 20 which is likewise adjustably fitted into the base 1 by means of a supporting bolt 30. This bumper 20 may be provided with some noise reducing means as a rubber knob or the like.

Mounted in the upper end of the support 17 is a horizontally extending bar or rod 22 as best shown in Figures 8 to 11 inclusive, this rod extending across the front edge of the base 1 of the machine and adapted to move inwardly and outwardly with respect thereto on account of the pivotal mounting of its support 17.

Figure 16:
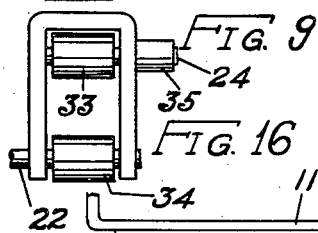
Figure 16 shows in larger detail the construction of the friction reducing rollers of the trigger mechanism, this being a modification.

Pivotally mounted on the inner end of the rod 22 is a trigger 23 which is in the form of a flat plate having an extending pin 24 either fixed into or integral therewith, the pin 24 being connected by means of a helical spring 25 to another pin 26 mounted on the upright or support 17. The helical spring 25 normally constrains the trigger 23 to remain in the position shown in Figures 7 and 12, this position being assured by reason of the fact that the pin 24, forming part of the trigger 23, acts against a stop 31 which comprises an integral extension of the arm or upright 17. This stop is formed at one end of the incline which comprises the upper end of the upright support 17 and over which the pin 24 rides in its action as best shown in Figures 12 to 14 inclusive. A modified form of the trigger mechanism is shown in Figures 7 to 11 inclusive and Figure 16, the flat plate of Figures 1, 3, 4, 12, 13 and 14 being replaced by a pair of rollers 33 and 34, the upper roller being mounted on that portion of the pin 24 which is inside the trigger frame structure and the lower roller being mounted on the corresponding portion of the stripper bar 22. A tubular rubber bumper 35 is placed on the pin 24 to reduce noise and shock.

In operation, the weighed or measured amount of meat 13 or other material to be molded is placed upon the uppermost of the wax sheets of paper 14, a number of which have been preliminarily mounted on the base 1 of the machine and which are held in position by means of the penetrating prongs 36 of the clamp 15, the machine at that time being in the position shown in Figures 1 and 2. It will be noted that the mold liner or sheet of Cellophane 9 is hanging loosely in the front of the mold head 6 and downwardly with respect thereto, being supported by the clamp element 11—10.

In operation, the handle 37 is grasped by the operator and the movable parts of the mechanism brought down smartly somewhat in the manner of using a hammer, and as best shown in Figure 3, the mold liner 9 will, on account of the air resistance, be blown directly under the mold head 6 so that the mold head itself does not actually contact the meat 13 or other material to be molded.

Just before contact with the meat is made, the pointed cam element 16, which is positioned on or forms part of the arm 11, will ride against the inner face of the trigger 23 as best shown in Figures 3, 8, 9 and 12. This cam action causes the support 17 to move outwardly about its pivot 18 and away from its stop element 20 against the tension of its spring 21. When this arm or support 17 moves outwardly around its pivot point 18, it carries with it the horizontal rod or stripper bar 22, and accordingly, the adjacent top portion of the sheet of Cellophane or other mold lining material is, at that instant, behind the rod 22, the remainder of the sheet 9 being clamped or caught between the molded patty and the inner face of the mold head, all as best shown in Figures 3 and 4.

Figure 10:
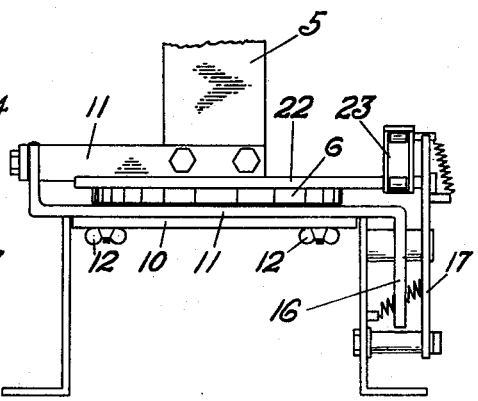
Figure 10 is a front detail of the cam and trigger with the head all the way down.

Upon release of the downward pull against the handle 37, the springs 7 and 8 act to immediately return the parts to normal upright position, pulling the mold 6 away from the base 1 and leaving the completed patty 27 on the uppermost sheet of waxed paper 14. In the meantime, however, the upper end of the cam 16 has ridden under the trigger 23 as best shown in Figures 4 and 10 whereupon the tension of the spring 21 causes the pivoted upright 17 to return to normal position against its bumper or stop 20. The rod or stripper bar 22 is then above the forward portion of the mold liner or sheet of Cellophane 9, the outermost edge of which has been previously clamped between the elements 10 and 11, which form part of the bracket or support of the cam 16. The clamp elements 10 and 11, which hold the upper edge of the mold liner 9, have thus moved down behind the stripper bar 22, thence forward under the same and finally up and in front of it, dragging the mold liner sheet along.

Figure 11:
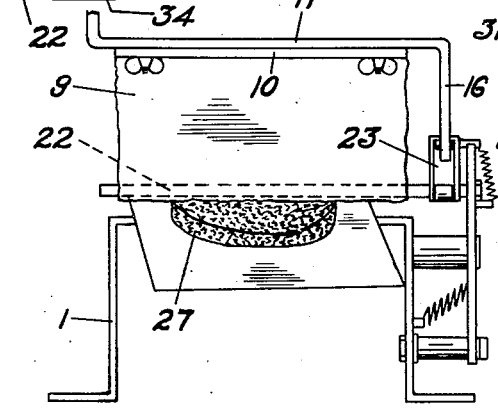
Figure 11 shows the patty ejecting action and mechanism.
Figures 12, 13, 14:
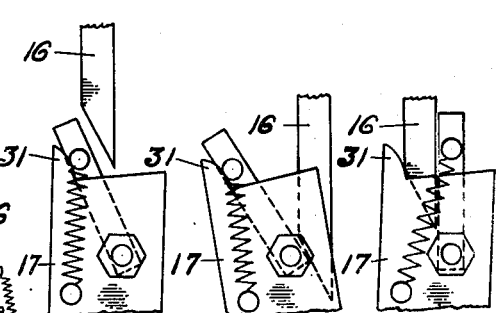
Figures 12, 13 and 14 are respectively enlarged views showing three operative positions of a part of the automatic patty ejecting mechanism.

Accordingly, upon the return movement, the mold liner 9 is drawn under and around the forward edge of the rod 22 as best shown in Figures 5 and 11, and the inherent stickiness of the material of the molded patty 27 causes the Cellophane in its forward movement under and around the rod 22 to pull the molded patty forward as best shown in Figure 5. The molded patty, of course, also adheres to the uppermost sheet of wax paper 14 which has been held under the clamp 15, and the pointed prongs 36 of the clamp 15 are rearwardly sharpened so that an easy cutting of the adjacent part of the paper is permitted whereby the uppermost sheet of wax paper is accordingly pulled away from the clamp 15 and allowed to ride forwardly off the base 1 with the completed patty 27. This action is illustrated in Figures 5 and 11 and upon a repetition of the operation just described, subsequent patties will be formed which will, on account of the similar ejecting motion, be automatically stacked in front of the machine in a pile somewhat as shown in Figure 6.

The machine as described can with little or no change be used for many other purposes such as making sausage patties, portions of dough to be cooked, or molding other plastic materials into desired shape and size. The apparatus can be used for tendering meat by substituting an element having a number of meat penetrating or cutting prongs for the mold head. Again, the machine may be used for flattening meat or similar products, particular reference being had to what is known as "frenching" of pork tenderloins. In this case, the mold head is replaced by a flat solid element with no recess therein, the piece of tenderloin to be frenched being placed on the uppermost sheet of supporting wax paper and the head of the machine being brought down precisely as in the molding operation whereupon the piece of meat will be desirably flattened and automatically ejected and stacked with others similarly treated.

It will be evident that herein is provided a hamburger patty or other molding device which, on account of its simplicity of construction and ease of operation will readily mold a great number of patties in a relatively short time with a minimum expenditure of time and effort, and it will also be evident that the molds themselves may be made of different sizes to accurately mold predetermined weights or measured portions of meat or the like.

The mold liner, being of Cellophane or some similar tough material, can be used repeatedly for many thousands of patties while a sufficient number of wax sheets can be initially placed on the machine to provide for the molding of from fifty to one hundred patties without replenishing the paper. The clamping means assures against the use of more than one sheet of paper with each patty, and the rolling of the sheet of Cellophane from the mold liner first under and then up and around the bar 22 provides a simple yet very effective and readily operated means of automatically ejecting and stacking the completed patties. The machine is not at all likely to get out of order, is completely sanitary, and in addition to its ease of operation, is compact and light of weight, thereby making it very desirable for operation in places where space is at a premium.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A molding device, including a molding table, means for removably positioning a plurality of product supporting sheets on the table, a molding head operatively associated with the table, a repeating liner for the head, and means associated and cooperating with the liner for removing the completed product with its supporting sheet from position beneath the molding head.

2. A molding device, including a molding table, means for removably positioning a plurality of product supporting sheets on the table, said means including a clamp, sheet piercing prongs on the clamp, a molding head reciprocatively associated with the table, a repeating liner for the head, and means associated and cooperating with the liner for removing the completed product with its supporting sheet from position beneath the molding head upon every reverse movement of the molding head.

3. A patty molding machine, including a base, means for removably positioning a plurality of patty supporting sheets on the base, a molding head, means for supporting the mold head for reciprocating movement above the base, a repeating liner for the mold head, and means associated and cooperating with the liner for removing a completed patty with its supporting sheet from position beneath the mold head.

4. A patty molding machine, including a base, means for removably positioning a plurality of patty supporting sheets on the base, a molding head, means for supporting the mold head for reciprocating movement above the base, a repeating liner for the mold head, means associated and cooperating with the liner for removing a completed patty with its supporting sheet from position beneath the mold head, said means comprising an upright pivotally mounted on the base, and a transverse rod fixed in the upright, the rod extending across the front edge of the base adjacent the product supporting sheets.

5. A patty molding machine, including a base, means for removably positioning a plurality of patty supporting sheets on the base, a molding head, means for supporting the mold head for reciprocating movement above the base, a repeating liner for the mold head, means associated and cooperating with the liner for removing a completed patty with its supporting sheet from position beneath the mold head, said means comprising an upright pivotally mounted on the base, a transverse rod fixed in the upright, the rod extending across the front edge of the base adjacent the product supporting sheets, and means for moving the upper end of the upright with its rod outwardly away from the product supporting sheets upon a downward movement of the mold head.

6. A patty molding machine, including a base, means for removably positioning a plurality of patty supporting sheets on the base, a molding head, means for supporting the mold head for reciprocating movement above the base, a repeating liner for the mold head, means associated and cooperating with the liner for removing a completed patty with its supporting sheet from position beneath the mold head, said means comprising an upright pivotally mounted on the base, a transverse rod fixed in the upright, the rod extending across the front edge of the base adjacent the product supporting sheets, means for moving the upper end of the upright with its rod outwardly away from the product supporting sheets upon a downward movement of the mold head, and further means for allowing the upright with its rod to again move inwardly with the rod and position the rod over the adjacent portion of the mold liner upon the completion of the downward molding stroke.

7. A patty molding machine, including a base, means for removably positioning a plurality of patty supporting sheets on the base, a molding head, means for supporting the mold head for reciprocating movement above the base, a repeating liner for the mold head, means associated and cooperating with the liner for removing a completed patty with its supporting sheet from position beneath the mold head, said means comprising an upright pivotally mounted on the base, a transverse rod fixed in the upright, the rod extending across the front edge of the base adjacent the product supporting sheets, means for moving the upper end of the upright with its rod outwardly away from the product supporting sheets upon a downward movement of the mold head, means for allowing the upright with its rod to again move inwardly with the rod and position the rod over the adjacent portion of the mold liner upon the completion of the downward molding stroke, and further means for pulling the mold liner with a completed patty adhesively secured thereto outwardly from the base.

8. A patty molding machine, including a base, means for removably positioning a plurality of patty supporting sheets on the base, a molding head, means for supporting the mold head for reciprocating movement above the base, a repeating liner for the mold head, means associated and cooperating with the liner for removing a completed patty with its supporting sheet from position beneath the mold head, said means comprising an upright pivotally mounted on the base, a transverse rod fixed in the upright, the rod extending across the front edge of the base adjacent the product supporting sheets, means for moving the upper end of the upright with its rod outwardly away from the product supporting sheets upon a downward movement of the mold head, means for allowing the upright with its rod to again move inwardly with the rod over the adjacent portion of the mold liner upon the completion of the downward molding stroke, and further means for pulling the mold liner with a completed patty adhesively secured thereto outwardly from the base and pulling the liner away from the completed patty at its shifting line of contact with the rod.

9. A patty molding machine, including a base, clamp means for removably positioning a plurality of patty supporting sheets on the base, a molding head, means for supporting the mold head for reciprocating movement above the base, a repeating liner for the mold head, means for supporting the liner by one edge adjacent the mold head means associated and cooperating with the liner for removing a completed patty with its supporting sheet from position beneath the mold head, said means comprising an upright pivotally mounted on the base, a transverse rod fixed in the upright, the rod extending across the front edge of the base adjacent the product supporting sheets, trigger and cam means for moving the upper end of the upright with its rod outwardly away from the product supporting sheets upon a downward movement of the mold head, means for allowing the upright with its rod to again move inwardly and position the rod over the adjacent portion of the mold liner upon the completion of the downward molding stroke, means for pulling the mold liner with a completed patty stuck thereto outwardly from the base and thence about the rod, pulling the liner away from the completed patty, and ejecting the patty with a supporting sheet on the underface thereof from the machine.

10. A mold, comprising a fixed support, a molding head reciprocatively mounted with respect to the support, and a combined repeating mold liner and product delivery means associated with the molding head.

11. A mold, comprising a fixed support, a molding head reciprocatively mounted with respect to the support, a combined repeating mold liner and product delivery means associated with the molding head, and means on the support for automatically removing the mold liner from the molded product on an upward movement of the molding head.

12. A mold, comprising a fixed support, a molding head reciprocatively mounted with respect to the support, a combined repeating mold liner and product delivery means associated with the molding head, and means for controlling the operation of the mold liner and product delivery means, said means including an upright arm pivotally mounted on the support, a rod in the upper end of the arm extending transversely across the forward end of the support, a spring-controlled trigger pivotally mounted on the rod, and means for supporting the mold liner adjacent the head, said means including a cam adapted to operate against the trigger.

13. A mold, comprising a fixed support, a molding head reciprocatively mounted with respect to the support, a combined repeating mold liner and product delivery means associated with the molding head, and means for controlling the operation of the mold liner and product delivery means, said means including an upright arm pivotally mounted on the support, a stripper bar in the upper end of the arm extending transversely across the forward end of the support, a spring-controlled trigger pivotally mounted on the bar, and bracket means for supporting the mold liner adjacent the head, said means including an integral cam adapted to operate against the trigger on the downward motion of the mold head pushing the arm and the stripper bar outwardly.

14. A mold, comprising a fixed support, a molding head reciprocatively mounted with respect to the support, a combined repeating mold liner and product delivery means associated with the molding head, and means for controlling the operation of the mold liner and product delivery means, said means including an upright mounted on the support, a rod in the upper end of the upright and extending transversely across the forward end of the support, a cam element mounted on the rod, means for supporting the mold liner adjacent the head, said means including a further cam element adapted to operate against the first cam and to ride against the rear face of the same on the downward movement of the mold head, and against the forward face of the same on the upward movement of the mold and mold lining sheet.

15. A patty molding machine, including a recessed mold head, a liner therefor, means for supporting the liner adjacent the recessed head, an opposed support for material to be molded, means for moving the recessed mold head downwardly and outwardly toward the support, thereby positioning the liner under the mold head and above the material to be molded, and means for automatically pulling the liner forwardly and outwardly from the mold head upon its upward movement, thereby removing the liner from the completed patty.

16. A patty molding machine, including a recessed mold head, a liner therefor, means for supporting the liner adjacent the recessed head, an opposed support for material to be molded, means for moving the recessed mold head downwardly and outwardly toward the support, positioning the liner under the mold head and above the material to be molded, means for automatically pulling the liner forwardly and outwardly from the mold head upon its upward movement, thereby removing the liner from the completed patty, and simultaneously ejecting the completed patty from the machine, said means including a stripper bar, means for supporting the bar for a reciprocating movement to and from the support, in parallel relationship therewith, means for so moving the bar, said means including a cam movable with the mold head and a roller bearing trigger mounted on the bar.

17. A patty molding apparatus including a base, a mold head above the base, means for reciprocatively positioning the mold head with respect to the base, a spring clamp on the base for supporting and retaining a plurality of patty molding sheets for automatic individual removal, a replaceable liner for the mold head, and means for automatically removing the liner with an attached patty and also with an attached patty supporting sheet from the mold head and the machine upon each upward movement of the mold head.

18. A device for flattening meat and the like, comprising a support, means for retaining a plurality of sheets on the support for an individual tearing removal therefrom, a flattening means reciprocatively mounted with respect to the support, means for moving the flattening means toward and from the support and against an object positioned on the topmost sheet, and means for automatically removing the flattened object with the topmost sheet attached thereto and under the product from the machine upon upward movement of the flattening element.

HARRY H. HOLLY.